(12) United States Patent
Aburatani et al.

(10) Patent No.: US 7,645,837 B2
(45) Date of Patent: Jan. 12, 2010

(54) CHLORINATED PROPYLENE POLYMER, PROCESS FOR PRODUCING THE SAME AND USE OF THE SAME

(75) Inventors: Ryo Aburatani, Ichihara (JP); Masanori Sera, Ichihara (JP); Yutaka Minami, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 599 days.

(21) Appl. No.: 10/569,139

(22) PCT Filed: Aug. 27, 2004

(86) PCT No.: PCT/JP2004/012769

§ 371 (c)(1),
(2), (4) Date: Feb. 22, 2006

(87) PCT Pub. No.: WO2005/021603

PCT Pub. Date: Mar. 10, 2005

(65) Prior Publication Data

US 2007/0010630 A1 Jan. 11, 2007

(30) Foreign Application Priority Data

Aug. 29, 2003 (JP) ............................. 2003-306071
Sep. 11, 2003 (JP) ............................. 2003-319652

(51) Int. Cl.
*C08F 10/00* (2006.01)

(52) U.S. Cl. .............. 525/334.1; 525/333.7; 525/326.1; 525/355; 525/356; 525/359.1; 525/416; 526/348; 526/351; 526/943; 502/300; 502/302; 502/103; 156/333; 156/334; 106/287.28; 428/32.1

(58) Field of Classification Search .............. 525/326.1, 525/333.7, 334.1, 355, 356, 359.1, 416; 526/348, 526/351, 943
See application file for complete search history.

(56) References Cited

U.S. PATENT DOCUMENTS

| 3,395,038 | A | 7/1968 | Lucchetti |
| 5,811,489 | A | 9/1998 | Shirai et al. |
| 6,734,270 | B1 * | 5/2004 | Minami et al. .............. 526/351 |
| 7,208,552 | B2 * | 4/2007 | Komoto et al. ........... 525/326.4 |

FOREIGN PATENT DOCUMENTS

| EP | 0 874 031 | | 10/1998 |
| EP | 1 403 314 | | 3/2004 |
| EP | 1 469 035 | | 10/2004 |
| JP | 59122503 | | 7/1984 |
| JP | 2001-172325 | | 6/2001 |
| JP | 2002-234976 | | 8/2002 |
| JP | 2003-27331 | | 1/2003 |
| JP | 2003-238750 | | 8/2003 |
| JP | 2003-321588 | | 11/2003 |
| WO | 01/25299 | * | 4/2001 |
| WO | 03/002659 | | 1/2003 |
| WO | 03/057778 | * | 7/2003 |

* cited by examiner

*Primary Examiner*—Vasu Jagannathan
*Assistant Examiner*—Robert C Boyle
(74) *Attorney, Agent, or Firm*—Oblon, Spivak, McClelland, Maier & Neustadt, L.L.P.

(57) ABSTRACT

A chlorinated propylene-based polymer of the present invention having a weight average molecular weight (Mw) as measured by gel permeation chromatography (GPC) of 5,000 to 100,000 and a chlorine content of 0.1 to 70% by mass has the following properties:

(1) it has a high solubility in a non-aromatic solvent having a low environmental burden even when it has a low degree of chlorination, and
(2) it can be inhibited from suffering a decrease in the properties inherent to polypropylenes, such as durability, mechanical properties, appearance and hydrophobicity, by regulating its degree of chlorination at a low value.

19 Claims, No Drawings

CHLORINATED PROPYLENE POLYMER, PROCESS FOR PRODUCING THE SAME AND USE OF THE SAME

TECHNICAL FIELD

The present invention relates to a chlorinated propylene-based polymer for use in a coating, an ink, an adhesive, etc., a process for the production thereof and use thereof.

BACKGROUND ART

Resins obtainable by chlorination of polyolefins have excellent properties in dissolution thereof in organic solvents and, therefore, are now industrially produced and used in a variety of fields. In particular, resins having a high chlorine content are used as corrosion-proof coatings for outdoor constructions, while resins having a low chlorine content which can adhere to polyolefin articles are used in an ink for polyolefin films or in a primer for coating polyolefin moldings.

Polyolefines are generally insoluble in aromatic organic solvents such as toluene and xylene but become soluble in organic solvents when chlorine is introduced thereinto.

Various methods are known to chlorinate polyolefins. They may be roughly classified into a method in which a polyolefin is chlorinated in the form of a suspended liquid (see Japanese Patent Publication No. Showa 36(1961)-4745, for example), a method in which a polyolefin is chlorinated in the form of a solution (see Japanese Patent Application Laid-Open No. Showa 48(1973)-8856, for example), and a method in which a polyolefin is chlorinated in the form of a bulk (see Japanese Patent Application Laid-Open No. Showa 46(1971)-737, for example). The suspended liquid chlorination method is carried out in such a manner that a polyolefin in the form of fine particles is suspended in water and chlorine gas is blown into the resulting suspended liquid while irradiating ultraviolet rays or after addition of a radical generating agent. After termination of the chlorination, the chlorinated product is separated from water and dried. The solution chlorination method is performed by dissolving a polyolefin in a chlorine-containing organic solvent which is inert to chlorine, such as carbon tetrachloride, chloroform, methylene chloride or trichloroethane, for example. Chlorine gas is blown into the resulting solution to chlorinate the polyolefin while irradiating ultraviolet rays or after addition of a radical generating agent. The product is separated from the solvent to obtain a chlorinated polyolefin. A method is also known in which a hydrocarbon solvent is used (see Japanese Patent Application Laid-Open No. Heisei 03(1991)-197510, for example). The bulk chlorination method is performed in such a manner that a polyolefin in the form of powder is chlorinated by contact with chlorine gas using, for example, a fluidized bed system.

A chlorinated polypropylene, which can be dissolved in organic solvents and is easy to handle, is particularly utilized in various applications. Because of low solubility of polypropylene being the base polymer, it has been difficult to obtain a satisfactory solubility unless the chlorination degree is made high. In this case, however, a reduction of durability, etc. of the base polymer is inevitably caused.

As a problem of chlorinated polypropylenes, there may be mentioned a future trend for non-toluene type products. It is most likely that the use of aromatic solvents will be prohibited within three to five years from now. In the current industry, toluene is used in all products. Study and development are thus being made with a view toward the realization of non-toluene products after five years from now.

DISCLOSURE OF THE INVENTION

The present invention has been made under the above circumstances and has its object the provision of a chlorinated propylene-based polymer having the features shown below, a process for the production thereof and use thereof:

(1) It has a high solubility in a non-aromatic solvent having a low environmental burden even when it has a low degree of chlorination, (2) It can be inhibited from suffering a decrease in the properties inherent to polypropylenes, such as durability, mechanical properties, appearance and hydrophobicity, by regulating its degree of chlorination at a low value.

The present inventors have found as a result of the earnest study that the above objects can be accomplished by chlorinating a specific propylene-based polymer and have completed the present invention. The gist of the present invention is as set forth below:

1. A chlorinated propylene-based polymer having a weight average molecular weight (Mw) as measured by gel permeation chromatography (GPC) of 5,000 to 100,000 and a chlorine content of 0.1 to 70% by mass.

2. A chlorinated propylene-based polymer having a chlorine content of 0.1 to 70% by mass and obtainable by subjecting a propylene-based polymer to a chlorination treatment, the propylene-based polymer satisfying the following requirements (1) to (3):

(1) the stereo-regularity index [mm] thereof determined from a peak derived from the methyl groups in the $^{13}$C-NMR spectrum is 20 to 90 mol %, (2) the intrinsic viscosity [η] thereof as measured at 135° C. in a tetralin solvent is 0.01 to 0.5 dL/g, and (3) the melting point (Tm-D) thereof as measured by a differential scanning calorimeter (DSC) is 0 to 120° C.

3. A chlorinated propylene-based polymer satisfying the following requirements:

(1) the chlorine content thereof is 0.1 to 70% by mass, (2) the weight average molecular weight (Mw) thereof as measured by gel permeation chromatography (GPC) is 5,000 to 100,000, and (3) the stereo-regularity [mm] thereof determined from a peak derived from the methyl groups in the $^{13}$C-NMR spectrum is 20 to 90 mol %.

4. A chlorinated propylene-based polymer satisfying the following requirements:

(1) the chlorine content thereof is 0.1 to 70% by mass, (2) the weight average molecular weight (Mw) thereof as measured by gel permeation chromatography (GPC) is 5,000 to 100,000, and (3) soluble in n-heptane solvent at 30° C. in an amount of at least 10% by mass as the polymer concentration.

5. A process for the production of a chlorinated propylene-based polymer according to any one of 1 to 4 above, characterized in that a propylene-based polymer is chlorinated using a chlorination agent, the propylene-based polymer being obtainable by homopolymerizing propylene, by homopolymerizing 1-butene, or by copolymerizing propylene with ethylene and/or an α-olefin having 4 to 20 carbon atoms in the presence of a polymerization catalyst comprising:

(A) a transition metal compound represented by the following formula (I)

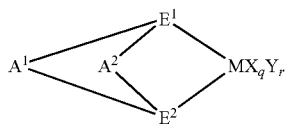

(I)

wherein

M represents a metal element belonging to the Groups 3 to 10 of the Periodic Table or to the lanthanoid series, $E^1$ and $E^2$, which may be the same or different and form a crosslinked structure with $A^1$ and $A^2$, each represent a ligand selected from the group consisting of a substituted cyclopentadienyl group, an indenyl group, a substituted indenyl group, a heterocyclopentadienyl group, a substituted heterocyclopentadienyl group, an amide group, a phosphide group, a hydrocarbyl group, and a silicon-containing group, X represents a σ bonding ligand, and when X is plural, X may be the same or different and may be crosslinked with other X, $E^1$, $E^2$ or Y, Y represents a Lewis base, and when Y is plural, Y may be the same or different and may be crosslinked with other Y, $E^1$, $E^2$ or X, $A^1$ and $A^2$, which may be the same or different, are each a bivalent crosslinking group bonding two ligands and each represent a hydrocarbyl group having 1 to 20 carbon atoms, a halogen-containing hydrocarbyl group having 1 to 20 carbon atoms, a silicon-containing group, a germanium-containing group, a tin-containing group, —O—, —CO—, —S—, —$SO_2$—, —Se—, —$NR^1$—, —$PR^1$—, —P(O)$R^1$—, —$BR^1$— or —$AlR^1$—, where $R^1$ represents a hydrogen atom, a halogen atom, a hydrocarbyl group having 1 to 20 carbon atoms or a halogen-containing hydrocarbyl group having 1 to 20 carbon atoms, q is an integer of 1 to 5 and represents [(valence of M)–2], and r is an integer of 0 to 3; and (B) a component selected from the group consisting of (B-1) a compound which can form an ionic complex by reaction with the above transition metal compound (A) or its derivative and (B-2) an aluminoxane.

6. A coating composition comprising, as its paint ingredient, a chlorinated propylene-based polymer as defined in any one of 1 to 4 above.

7. An ink composition comprising, as its ink ingredient, a chlorinated propylene-based polymer as defined in any one of 1 to 4 above.

8. An adhesive composition comprising, as its adhesive ingredient, a chlorinated propylene-based polymer as defined in any one of 1 to 4 above.

PREFERRED EMBODIMENT FOR CARRYING OUT THE INVENTION

At the outset, in the whole invention of the present application, the term "propylene-based polymer" used as a raw material for a chlorinated propylene-based polymer is intended to refer to a propylene homopolymer, a butene homopolymer or a copolymer of propylene with ethylene and/or an α-olefin having 4 to 20 carbon atoms.

The first aspect of the present invention provides a chlorinated propylene-based polymer having a weight average molecular weight (Mw) as measured by gel permeation chromatography (GPC) of 5,000 to 100,000 and a chlorine content of 0.1 to 70% by mass.

The measurement by GPC method was performed using the equipment and conditions shown below. The Mw is expressed as propylene homopolymer equivalent.

Column: TOSO GMHHR-H(S)HT

Detector: RI Detector (WATERS 150 C.) for liquid chromatogram

Temperature: 145° C.

Solvent: 1,2,4-trichlorobenzene

Sample concentration: 2.2 mg/mL

Calibration curve: Universal Calibration (Standard: polystyrene)

A Mw of less than 5,000 is not preferable because the polymer is so sticky that it is difficult to utilize the polymer for various applications. Too high a Mw in excess of 100,000 is not preferable because the viscosity of the polymer during the production thereof increases so that the production thereof encounters a difficulty and the load on equipments for the industrial production thereof is great. The Mw is preferably in the range of 10,000 to 100,000, more preferably in the range of 10,000 to 80,000.

The chlorine content of the chlorinated propylene-based polymer is 1 to 70% by mass. The method of measurement of the chlorine content is as follows.

A chlorinated propylene-based polymer was dissolved in n-hexane with heating, to which polyethylene powder was added. After the n-hexane was removed by distillation, the remaining polymer was dried under vacuum. The dried mass was heat-pressed at 160° C. and the chlorine content was quantitatively analyzed using fluorescent X-ray.

A chlorine content of less than 0.1% by mass is insufficient to obtain the effect of the introduction of chlorine. Too high a chlorine content in excess of 70% by mass is not preferable because the durability, mechanical properties, appearance and hydrophobicity which are inherent to the propylene-based polymer are reduced. The chlorine content is preferably in the range of 0.1 to 50% by mass, more preferably in the range of 0.1 to 20% by mass.

The second aspect of the present invention provides a chlorinated propylene-based polymer having a chlorine content of 0.1 to 70% by mass and obtainable by subjecting a propylene-based polymer to a chlorination treatment, wherein the propylene-based polymer satisfies the requirements (1) to (3) shown below.

The propylene-based polymer used as the raw material should satisfy the requirements (1) to (3) shown below:

(1) The stereo-regularity index [mm] of the polymer as determined from a peak derived from the methyl groups in the $^{13}$C-NMR spectrum is 20 to 90 mol %.

The stereo-regularity index [mm] is determined in accordance with the method reported in "Macromolecules," 6, 925 (1973) and proposed in "Macromolecules," 8, 687(1975) by A. Zambelli, et al., respectively. With regard to the stereo-regularity of the hereinafter described chlorinated propylene-based polymer, the peaks of the methyl group region slightly change depending upon the degree of chlorination. However, the stereo-regularity index is calculated in the customarily employed manner from the peak areas of the regions of [mm] 22.5 to 21.23 ppm, [mr] 21.23 to 20.53 ppm and [rr] 20.53 to 19.84 ppm (tetramethylsilane standard).

The measurement was carried out using the following equipment and conditions:

Equipment: $^{13}$C-NMR apparatus, Model JNM-EX400 manufactured by Nippon Denshi Co., Ltd.
Method: proton complete decoupling method
Solvent: mixed solvent of 1,2,4-trichlorobenzene and heavy benzene (volume ratio of 90:10)
Temperature: 130° C.
Pulse width: 45°
Pulse repeating time: 4 seconds
Integration: 10,000 times When the stereo-regularity index [mm] is less than 20 mol %, there is a possibility that the chlorinated propylene-based polymer product becomes undesirably sticky. When the index [mm] is greater than 90 mol %, the chlorinated propylene-based polymer product has reduced flexibility and becomes undesirably brittle. The index [mm] is preferably in the range of 30 to 90 mol %, more preferably in the range of 40 to 70 mol %.

(2) The intrinsic viscosity [η] of the polymer measured at 135° C. in a tetralin solvent is 0.01 to 0.5 dL/g.

The intrinsic viscosity [η] herein was measured at 135° C. in a tetralin solvent using an automatic viscometer, Model VMR-053 manufactured by Rigosha Co., Ltd.

When the intrinsic viscosity [η] is less than 0.01 dL/g, there is a possibility that the chlorinated propylene-based polymer product becomes undesirably sticky. When the viscosity [η] is greater than 0.5 dL/g, the viscosity of a solution of the chlorinated propylene-based polymer product is undesirably high so that it is difficult to handle the solution at the time the solution is utilized for various applications.

(3) The melting point (Tm-D) of the polymer as measured by differential scanning calorimeter (DSC) is 0 to 120° C.

The measurement method of (Tm-D) is as follows. Using a differential scanning calorimeter DSC (DSC-7 manufactured by Perkin Elmer Corp.), a sample (10 mg) is maintained at −10° C. for 5 minutes in a nitrogen atmosphere and, thereafter, is heated at a heating rate of 10° C./minute to 220° C. to obtain an endothermic fusion curve. The melting point (Tm-D) is defined as the temperature of the top of the peak observed on the highest temperature side in the fusion curve.

When the melting point is lower than 0° C., there is a possibility that the chlorinated propylene-based polymer product becomes undesirably sticky. The fact that the melting point is higher than 120° C. indicates that the degree of chlorination of the chlorinated propylene-based polymer product is low and means that the solubility thereof is low. This is not preferable because it is difficult to utilize the product in various applications.

The chlorine content of the chlorinated propylene-based polymer is 0.1 to 70% by mass. The details of the chlorine content are as described previously.

The third aspect of the present invention provides a chlorinated propylene-based polymer satisfying the following requirements:

(1) The chlorine content of the polymer is 0.1 to 70% by mass.

The details of the chlorine content are as described previously.

(2) The weight average molecular weight (Mw) of the polymer as measured by gel permeation chromatography (GPC) is 5,000 to 100,000.

The GPC measuring method and details of the weight average molecular weight (Mw) are as described previously.

(3) The stereo-regularity index [mm] of the polymer determined from a peak derived from the methyl groups in the $^{13}$C-NMR spectrum is 20 to 90 mol %.

The measuring method of the index [mm] is as described previously. When [mm] is less than 20 mol %, there is a possibility that the chlorinated propylene-based polymer product becomes undesirably sticky. When the index [mm] is greater than 90 mol %, the chlorinated propylene-based polymer product has reduced flexibility and becomes undesirably brittle. The index [mm] is preferably in the range of 30 to 90 mol %, more preferably in the range of 40 to 70 mol %.

The fourth aspect of the present invention provides a chlorinated propylene-based polymer satisfying the following requirements:

(1) The chlorine content of the polymer is 0.1 to 70% by mass.

The details of the chlorine content are as described previously.

(2) The weight average molecular weight (Mw) thereof as measured by gel permeation chromatography (GPC) is 5,000 to 100,000.

The GPC measuring method and details of the weight average molecular weight (Mw) are as described previously.

(3) The polymer is soluble in n-heptane solvent at 30° C. in an amount of at least 10% by mass as the polymer concentration.

The solubility of the polymer in at least 10% by mass is preferable from the industrial standpoint when it is utilized for various applications. The concentration of lower than 10% by mass is not preferable because a large amount of energy is required for drying after application.

Description will be next made of the preferred processes for the production of the raw material propylene-based polymer.

As the process for the production of the raw material propylene-based polymer, there may be mentioned a process for homopolymerizing propylene, a process for homopolymerizing 1-butene, and a process for copolymerizing propylene with ethylene and/or an α-olefin having 4 to 20 carbon atoms in the presence of a catalyst system called metallocene catalyst. As the metallocene catalyst, there may be mentioned a transition metal compound having one or two ligands such as those described in Japanese Patent Application Laid-Open Nos. Showa 58(1983)-19309, Showa 61(1986)-130314, Heisei 03(1991)-163088, Heisei04(1992)-300887, Heisei 04(1992)-211694 and Heisei 01(1989)-502036, for example a cyclopentadienyl group, a substituted cyclopentadienyl group, an indenyl group and a substituted indenyl group, and a catalyst obtainable by combining a transition metal compound, in which the above ligand or ligands are geometrically controlled, with a promoter.

Among metallocene catalysts, those which include a transition metal compound having a ligand forming a crosslinked structure through a crosslinking group are preferred for this invention. Especially, a process for homopolymerizing propylene, a process for homopolymerizing 1-butene, and a process for copolymerizing propylene with ethylene and/or an α-olefin having 4 to 20 carbon atoms in the presence of a metallocene catalyst obtainable by combining a transition metal compound having a crosslinked structure through two crosslinking groups with a promoter, are particularly preferred.

In particular, there may be mentioned a process for homopolymerizing propylene, a process for homopolymerizing 1-butene, and a process for copolymerizing propylene with ethylene and/or an α-olefin having 4 to 20 carbon atoms in the presence of a polymerization catalyst which comprises:

(A) a transition metal compound represented by the following formula (I):

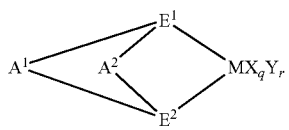
(I)

wherein

M represents a metal element belonging to the Groups 3 to 10 of the Periodic Table or to the lanthanoid series, $E^1$ and $E^2$, which may be the same or different and form a crosslinked structure with $A^1$ and $A^2$, each represent a ligand selected from the group consisting of a substituted cyclopentadienyl group, an indenyl group, a substituted indenyl group, a heterocyclopentadienyl group, a substituted heterocyclopentadienyl group, an amide group, a phosphide group, a hydrocarbyl group and a silicon-containing group, X represents a σ bonding ligand, and when X is plural, X may be the same or different and may be crosslinked with other X, $E^1$, $E^2$ or Y, Y represents a Lewis base, and when Y is plural, Y may be the same or different and may be crosslinked with other Y, $E^1$, $E^2$ or X, $A^1$ and $A^2$, which may be the same or different, are each a bivalent crosslinking group bonding two ligands and each represent a hydrocarbyl group having 1 to 20 carbon atoms, a halogen-containing hydrocarbyl group having 1 to 20 carbon atoms, a silicon-containing group, a germanium-containing group, a tin-containing group, —O—, —CO—, —S—, —$SO_2$—, —Se—, —$NR^1$—, —$PR^1$—, —$P(O)R^1$—, —$BR^1$— or —$AlR^1$—, where $R^1$ represents a hydrogen atom, a halogen atom, a hydrocarbyl group having 1 to 20 carbon atoms or a halogen-containing hydrocarbyl group having 1 to 20 carbon atoms, q is an integer of 1 to 5 and represents [(valence of M)−2], and r is an integer of 0 to 3; and (B) a component selected from the group consisting of (B-1) a compound which can form an ionic complex by reaction with the above transition metal compound (A) or its derivative and (B-2) an aluminoxane.

In the above general formula (I), M represents a metal element belonging to the Groups 3 to 10 or to lanthanoid series in the Periodic Table, for example titanium, zirconium, hafnium, yttrium, vanadium, chromium, manganese, nickel, cobalt, palladium, and lanthanoid series metals. Above all, titanium, zirconium and hafnium are preferred from the standpoint of olefin polymerization activity. Each of $E^1$ and $E^2$ represents a ligand selected from a substituted cyclopentadienyl group, an indenyl group, a substituted indenyl group, a heterocyclopentadienyl group, a substituted heterocyclopentadienyl group, an amide group (—N<), a phosphine group (—P<), a hydrocarbyl group [>CR— or >C<] and a silicon containing group [>SiR— or >Si<] (wherein R represents a hydrogen atom or a hydrocarbyl group having 1 to 20 carbon atoms or a heteroatom-containing group). $E^1$ and $E^2$ form a crosslinked structure with $A^1$ and $A^2$ and may be the same or different with each other. As $E^1$ and $E^2$, a substituted cyclopentadienyl group, an indenyl group, and a substituted indenyl group are preferred.

X represents a σ-bonding ligand. When X is plural, they may be the same or different with each other and may be crosslinked with other X, $E^1$, $E^2$, or Y. Examples of the ligand X includes a halogen atom, a hydrocarbyl group having 1 to 20 carbon atoms, an alkoxy group having 1 to 20 carbon atoms, an aryloxy group having 6 to 20 carbon atoms, an amide group having 1 to 20 carbon atoms, a silicon-containing group having 1 to 20 carbon atoms, a phosphide group having 1 to 20 carbon atoms, a sulfide group having 1 to 20 carbon atoms, an acyl group having 1 to 20 carbon atoms. On the other hand, Y represents Lewis base. When Y is plural, they may be the same or different and may be crosslinked with other Y, $E^1$, $E^2$, or X. Examples of the Lewis base Y include amines, ethers, phosphines and thioethers.

The groups $A^1$ and $A^2$ are each a bivalent crosslinking group bonding two ligands and each represent a hydrocarbyl group having 1 to 20 carbon atoms, a halogen-containing hydrocarbyl group having 1 to 20 carbon atoms, a silicon-containing group, a germanium-containing group, a tin-containing group, —O—, —CO—, —S—, —$SO_2$—, —Se—, —$NR^1$—, —$PR^1$—, —$P(O)R^1$—, —$BR^1$— or —$AlR^1$—, where $R^1$ represents a hydrogen atom, a halogen atom or a hydrocarbyl group having 1 to 20 carbon atoms, a halogen-containing hydrocarbyl group having 1 to 20 carbon atoms. The groups $A^1$ and $A^2$ may be the same or different. Examples of such crosslinking group include those represented by the following general formula:

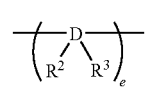
(V)

wherein $R^2$ and $R^3$, which may be the same or different and may be taken together to form a cyclic structure, each represent a hydrogen atom or a hydrocarbyl group having 1 to 20 carbon atoms, and e is an integer of 1 to 4. Examples of $R^2$ and $R^3$ include a methylene group, an ethylene group, an ethylidene group, a propylidene group, an isopropylidene group, a cyclohexylidene group, a 1,2-cyclohexylene group, a vinylidene group ($CH_2$=C=), a dimethylsilylene group, a diphenylsilylene group, a methylphenylsilylene group, a dimethylgermilene group, a dimethylstannylene group, a tetramethyldisilylene group, and a diphenyldisilylene group. Above all, an ethylene group, an isopropylidene group, and a dimethylsilylene group are preferred.

The symbol q is an integer of 1 to 5 and represents [(valence of M)−2], and r is an integer of 0 to 3.

When, in the transition metal compound represented by the general formula (I), $E^1$ and $E^2$ each represent a substituted cyclopentadienyl group, an indenyl group or a substituted indenyl group, it is preferred that the crosslinking groups $A^1$ and $A^2$ are each in the form of a (1,2')(2,1')-type double crosslinking linkage.

Among the transition metal compounds represented by the formula (I), the transition metal compound represented by general formula (II) shown below and having double crosslinked biscyclopentadienyl derivative as ligand is preferred:

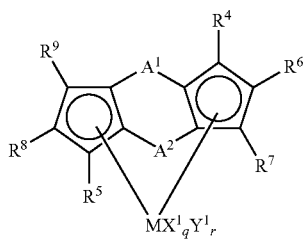

(II)

In the general formula (II) above, M, $A^1$, $A^2$, q, and r are the same as defined above. $X^1$ represents a σ-bonding ligand and, when $X^1$ is plural, they may be the same or different and may be crosslinked with other $X^1$ or $Y^1$. As examples of the group $X^1$, there may be mentioned those described previously in connection with the group X in the general formula (I). $Y^1$ represents a Lewis base, and when $Y^1$ is plural, they may be the same or different and may be crosslinked with other $Y^1$ or $X^1$. As examples of the group $Y^1$, there may be mentioned those described previously in connection with the group Y in the general formula (I). Each of $R^4$ to $R^9$ represents a hydrogen atom, a halogen atom, a hydrocarbyl group having 1 to 20 carbon atoms, a halogen atom containing hydrocarbyl group having 1 to 20 carbon atoms, a silicon containing group or a heteroatom containing group, with the proviso that at least one of them is not a hydrogen atom. Further, $R^4$ to $R^9$ may be the same or different and adjacent two of them may be taken together to form a ring. Especially it is preferred that $R^6$ and $R^7$ form a ring and $R^8$ and $R^9$ form a ring. As $R^4$ and $R^5$, a group containing a heteroatom such as oxygen, halogen or silicon is preferred for reasons of providing a high polymerization activity.

In such a transition metal compound with a double crosslinked biscyclopentadienyl derivative as a ligand, the ligand is preferably of a type which has a (1,2')(2,1')-type double crosslinking linkage. Examples of the transition metal compound represented by the general formula (I) include, but not limited thereto, (1,2'-ethylene)(2,1'-ethylene)-bis(indenyl) zirconium dichloride, (1,2'-methylene)(2,1'-methylene)-bis(indenyl) zirconium dichloride, (1,2'-isopropylidene)(2,1'-isopropylidene)-bis(indenyl) zirconium dichloride, (1,2'-ethylene)(2,1'-ethylene)-bis(3-methylindenyl) zirconium dichloride, (1,2'-ethylene)(2,1'-ethylene)-bis(4,5-benzoindenyl) zirconium dichloride, (1,2'-ethylene)(2,1'-ethylene)-bis(4-isopropylindenyl) zirconium dichloride, (1,2'-ethylene)(2,1'-ethylene)-bis(5,6-dimethylindenyl) zirconium dichloride, (1,2'-ethylene)(2,1'-ethylene)-bis(4,7-diisopropylindenyl) zirconium dichloride, (1,2'-ethylene)(2,1'-ethylene)-bis(4-phenylindenyl) zirconium dichloride, (1,2'-ethylene)(2,1'-ethylene)-bis(3-methyl-4-isopropylindenyl) zirconium dichloride, (1,2'-ethylene)(2,1'-ethylene)-bis(5,6-benzoindenyl) zirconium dichloride, (1,2'-ethylene)(2,1'-isopropylidene)-bis(indenyl) zirconium dichloride, (1,2'-methylene)(2,1'-ethylene)-bis(indenyl) zirconium dichloride, (1,2'-methylene)(2,1'-isopropylidene)-bis(indenyl) zirconium dichloride, (1,2'-dimethylsilylene)(2,1'-dimethylsilylene)bis(indenyl) zirconium dichloride, (1,2'-dimethylsilylene)(2,1'-dimethylsilylene)bis(3-methylindenyl) zirconium dichloride, (1,2'-dimethylsilylene)(2,1'-dimethylsilylene)bis(3-n-butylindenyl) zirconium dichloride, (1,2'-dimethyl-silylene) (2,1'-dimethylsilylene)bis(3-i-propylindenyl) zirconium dichloride, (1,2'-dimethylsilylene)(2,1'-dimethylsilylene)bis(3-trimethylsilylmethylindenyl) zirconium dichloride, (1,2'-dimethylsilylene)(2,1'-dimethylsilylene)bis(3-phenylindenyl) zirconium dichloride, (1,2'-dimethylsilylene)(2,1'-dimethylsilylene)bis(4,5-benzoindenyl) zirconium dichloride, (1,2'-dimethylsilylene)(2,1'-dimethylsilylene)bis(4-isopropylindenyl) zirconium dichloride, (1,2'-dimethylsilylene)(2,1'-dimethylsilylene)bis(5,6-dimethylindenyl) zirconium dichloride, (1,2'-dimethylsilylene)(2,1'-dimethylsilylene)bis(4,7-di-i-propylindenyl) zirconium dichloride, (1,2'-dimethylsilylene)(2,1'-dimethylsilylene)bis(4-phenylindenyl) zirconium dichloride, (1,2'-dimethylsilylene)(2,1'-dimethylsilylene)bis(3-methyl-4-i-propylindenyl) zirconium dichloride, (1,2'-dimethylsilylene)(2,1'-dimethylsilylene)bis(5,6-benzoindenyl) zirconium dichloride, (1,2'-dimethylsilylene)(2,1'-isopropylidene)-bis(indenyl) zirconium dichloride, (1,2'-dimethylsilylene)(2,1'-isopropylidene)-bis(3-methylindenyl) zirconium dichloride, (1,2'-dimethylsilylene)(2,1'-isopropylidene)-bis(3-i-propylindenyl) zirconium dichloride, (1,2'-dimethylsilylene)(2,1'-isopropylidene)-bis(3-n-butylindenyl) zirconium dichloride, (1,2'-dimethylsilylene)(2,1'-isopropylidene)-bis(3-trimethylsilylmethylindenyl) zirconium dichloride, (1,2'-dimethylsilylene)(2,1'-isopropylidene)-bis(3-trimethylsilylindenyl) zirconium dichloride, (1,2'-dimethyl silylene)(2,1'-isopropylidene)-bis(3-phenylindenyl) zirconium dichloride, (1,2'-dimethylsilylene)(2,1'-methylene)-bis(indenyl) zirconium dichloride, (1,2'-dimethylsilylene)(2,1'-methylene)-bis(3-methylindenyl) zirconium dichloride, (1,2'-dimethylsilylene)(2,1'-methylene)-bis(3-i-propylindenyl) zirconium dichloride, (1,2'-dimethylsilylene)(2,1'-methylene)-bis(3-n-butylindenyl) zirconium dichloride, (1,2'-dimethylsilylene)(2,1'-methylene)-bis(3-trimethylsilylmethylindenyl) zirconium dichloride, (1,2'-dimethylsilylene)(2,1'-methylene)-bis(3-trimethylsilylindenyl) zirconium dichloride, (1,2'-diphenylsilylene)(2,1'-methylene)-bis(indenyl) zirconium dichloride, (1,2'-diphenylsilylene)(2,1'-methylene)-bis(3-methylindenyl) zirconium dichloride, (1,2'-diphenylsilylene)(2,1'-methylene)-bis(3-i-propylindenyl) zirconium dichloride, (1,2'-diphenylsilylene) (2,1'-methylene)-bis(3-n-butylindenyl) zirconium dichloride, (1,2'-diphenylsilylene)(2,1'-methylene)-bis(3-trimethylsilylmethylindenyl) zirconium dichloride, (1,2'-diphenylsilylene)(2,1'-methylene)-bis(3-trimethylsilylindenyl) zirconium dichloride, (1,2'-dimethylsilylene)(2,1'-dimethylsilylene)(3-methylcyclopentadienyl)(3'-methylcyclopentadienyl) zirconium dichloride, (1,2'-dimethylsilylene)(2,1'-isopropylidene)(3-methylcyclopentadienyl)(3'-methylcyclopentadienyl) zirconium dichloride, (1,2'-dimethylsilylene)(2,1'-ethylene)(3-methylcyclopentadienyl)(3'-methylcyclopentadienyl) zirconium dichloride, (1,2'-ethylene)(2,1'-methylene)(3-methylcyclopentadienyl)(3'-methylcyclopentadienyl) zirconium dichloride, (1,2'-ethylene)(2,1'-isopropylidene)(3-methylcyclopentadienyl)(3'-methylcyclopentadienyl) zirconium dichloride, (1,2'-methylene)(2,1'-methylene)(3-methylcyclopentadienyl)(3'-methylcyclopentadienyl) zirconium dichloride, (1,2'-methylene)(2,1'-isopropylidene)(3-methylcyclopentadienyl)(3'-methylcyclopentadienyl) zirconium dichloride, (1,2'-isopropylidene)(2,1'-isopropylidene)(3-methylcyclopentadienyl)(3'-methylcyclopentadienyl) zirconium dichloride, (1,2'-dimethylsilylene)(2,1'-dimethylsilylene)(3,4-dimethylcyclopentadienyl)(3',4'-dimethylcyclopentadienyl) zirconium dichloride, (1,2'-dimethylsilylene)(2,1'-isopropylidene)(3,4-dimethylcyclopentadienyl) (3',4'-dimethylcyclopentadienyl) zirconium dichloride, (1,2'-dimethylsilylene)(2,1'-ethylene)(3,4-dimethylcyclopentadienyl)(3',4'-dimethylcyclopentadienyl) zirconium dichloride, (1,2'-ethylene)(2,1'-methylene)(3,4-dimethylcyclopentadienyl)(3',4'-dimethyl-cyclopentadienyl)

zirconium dichloride, (1,2'-ethylene)(2,1'-isopropylidene)(3,4-dimethylcyclopentadienyl)(3',4'-dimethylcyclopentadienyl) zirconium dichloride, (1,2'-methylene)(2,1'-methylene)(3,4-dimethylcyclopentadienyl)(3',4'-dimethylcyclopentadienyl) zirconium dichloride, (1,2'-methylene)(2,1'-isopropylidene)(3,4-dimethylcyclopentadienyl)(3',4'-dimethylcyclopentadienyl) zirconium dichloride, (1,2'-isopropylidene)(2,1'-isopropylidene)(3,4-dimethylcyclopentadienyl)(3',4'-dimethylcyclopentadienyl) zirconium dichloride, (1,2'-dimethylsilylene)(2,1-dimethylsilylene)(3-methyl-5-ethylcyclopentadienyl)(3'-methyl-5'-ethylcyclopentadienyl) zirconium dichloride, (1,2'-dimethylsilylene)(2,1'-dimethylsilylene)(3-methyl-5-ethylcyclopentadienyl)(3'-methyl-5'-ethylcyclopentadienyl) zirconium dichloride, (1,2'-dimethylsilylene)(2,1'-dimethylsilylene)(3-methyl-5-isopropylcyclopentadienyl)(3'-methyl-5'-isopropylcyclopentadienyl) zirconium dichloride, (1,2'-dimethylsilylene)(2,1'-dimethylsilylene)(3-methyl-5-n-butylcyclopentadienyl) (3'-methyl-5'-n-butylcyclopentadienyl) zirconium dichloride, (1,2'-dimethylsilylene)(2,1'-dimethylsilylene)(3-methyl-5-phenylcyclopentadienyl)(3'-methyl-5'-phenylcyclopentadienyl) zirconium dichloride, (1,2'-dimethylsilylene)(2,1'-isopropylidene)(3-methyl-5-ethylcyclopentadienyl)(3'-methyl-5'-ethylcyclopentadienyl) zirconium dichloride, (1,2'-dimethylsilylene)(2,1'-isopropylidene)(3-methyl-5-i-propylcyclopentadienyl)(3'-methyl-5'-i-propylcyclopentadienyl) zirconium dichloride, (1,2'-dimethylsilylene)(2,1'-isopropylidene)(3-methyl-5-n-butylcyclopentadienyl)(3'-methyl-5'-n-butylcyclopentadienyl) zirconium dichloride, (1,2'-dimethylsilylene)(2,1'-isopropylidene)(3-methyl-5-phenylcyclopentadienyl)(3'-methyl-5'-phenylcyclopentadienyl) zirconium dichloride, (1,2'-dimethylsilylene)(2,1'-ethylene)(3-methyl-5-ethylcyclopentadienyl)(3'-methyl-5'-ethylcyclopentadienyl) zirconium dichloride, (1,2'-diemthylsilylene)(2,1'-ethylene)(3-methyl-5-i-propylcyclopentadienyl)(3'-methyl-5'-i-propylcyclopentadienyl) zirconium dichloride, (1,2'-dimethylsilylene)(2,1'-ethylene)(3-methyl-5-n-butylcyclopentadienyl)(3'-methyl-5'-n-butylcyclopentadienyl) zirconium dichloride, (1,2'-dimethylsilylene)(2,1'-ethylene)(3-methyl-5-phenylcyclopentadienyl)(3'-methyl-5'-phenylcyclopentadienyl) zirconium dichloride, (1,2'-dimethylsilylene) (2,1'-methylene)(3-methyl-5-ethylcyclopentadienyl)(3'-methyl-5'-ethylcyclopentadienyl) zirconium dichloride, (1,2'-dimethylsilylene)(2,1'-methylene)(3-methyl-5-i-propylcyclopentadienyl)(3'-methyl-5'-i-propylcyclopentadienyl) zirconium dichloride, (1,2'-dimethylsilylene)(2,1'-methylene)(3-methyl-5-n-butylcyclopentadienyl)(3'-methyl-5'-n-butylcyclopentadienyl) zirconium dichloride, (1,2'-dimethylsilylene)(2,1'-methylene)(3-methyl-5-phenylcyclopentadienyl)(3'-methyl-5'-phenylcyclopentadienyl) zirconium dichloride, (1,2'-ethylene)(2,1'-methylene)(3-methyl-5-i-propylcyclopentadienyl)(3'-methyl-5'-i-propylcyclopentadienyl) zirconium dichloride, (1,2'-ethylene)(2,1'-isopropylidene)(3-methyl-5-i-propylcyclopentadienyl)(3'-methyl-5'-i-propylcyclopentadienyl) zirconium dichloride, (1,2'-methylene)(2,1'-methylene)(3-methyl-5-i-propylcyclopentadienyl)(3'-methyl-5'-i-propylcyclopentadienyl) zirconium dichloride, (1,2'-methylene) (2,1'-isopropylidene)(3-methyl-5-i-propylcyclopentadienyl)(3'-methyl-5'-i-propylcyclopentadienyl) zirconium a dichloride, and those compounds in which each of the zirconium is substituted with titanium or hafnium. The above compounds may be similar compounds in which metals of other Groups or lanthanoide series are used.

Next, as component (B-1) of component (B), there may be used any compound which can form an ionic complex by reacting with the transition metal compound of component (A) described above. However, the compound represented by the following general formula (III) or (IV) may be preferably used:

  (III)

  (IV)

wherein $L^2$ is $M^2$, $R^{11}R^{12}M^3$, $R^{13}{}_3C$, or $R^{14}M^3$.

In the formula (III) and (I), $L^1$ is a Lewis base; $[Z]^-$ is a non-coordinating anion $[Z^1]^-$ and $[Z^2]^-$, where $[Z^1]^-$ is an anion in which plural groups are bonded to a chemical element, namely, $[M^1G^1G^2 \ldots G^f]^-$ (where $M^1$ represents a chemical element belonging to the Group 5 to 15 of the Periodic Table, preferably the Group 13 to 15 of the Periodic Table, $G^1$ to $G^f$ are each a hydrogen atom, a halogen atom, an alkyl group having 1 to 20 carbon atoms, a dialkylamino group having 2 to 40 carbon atoms, an alkoxy group having 1 to 20 carbon atoms, an aryl group having 6 to 20 carbon atoms, an aryloxy group having 6 to 20 carbon atoms, an alkylaryl group having 7 to 40 carbon atoms, an arylalkyl group having 7 to 40 carbon atoms, a halogen-substituted hydrocarbyl group having 1 to 20 carbon atoms, an acyloxy group having 1 to 20 carbon atoms, an organic metalloid group or a heteroatom-containing hydrocarbyl group having 2 to 20 carbon atoms, or at least two of $G^1$ to $G^f$ may be taken together to form a ring, and f is an integer of [(valence of the center metal $M^1$)+1]), and $[Z^2]^-$ is a conjugate base of a Brønsted acid by itself (the acid has a logarithm of reciprocal of its acid dissociation constant (pKa) of not greater than –10) or a combination of the Brønsted acid with a Lewis acid, or a conjugate base of an acid which is generally defined as super-strong acid (a Lewis base may be coordinated). $R^{10}$ represents a hydrogen atom, an alkyl group having 1 to 20 carbon atoms, an aryl group having 6 to 20 carbon atoms, an alkylaryl group or an allylalkyl group. $R^{11}$ and $R^{12}$ each represent a cyclopentadienyl group, a substituted cyclopentadienyl group, an indenyl group, or a fluorenyl group. $R^{13}$ represents an alkyl group having 1 to 20 carbon atoms, an aryl group, an alkylaryl group or an arylalkyl group. $R^{14}$ represents a large cyclic ligand such as tetraphenylporphyrin or phthalocyanin. k is an ionic valence of $[L^1-R^{10}]$ and $[L^2]$ and is an integer of 1 to 3. a is an integer of at least 1, and b=(k×a). $M^2$ is a chemical element belonging to the Groups 1 to 3, 11 to 13 and 17 of the Periodic Table. $M^3$ represents a chemical element belonging to the Groups 7 to 12 of the Periodic Table.

Examples of $L^1$ include amines such as ammonia, methylamine, aniline, dimethylamine, diethylamine, N-methylaniline, diphenylamine, N,N-dimethylaniline, trimethylamine, triethylamine, tri-n-butylamine, methyldiphenylamine, pyridine, p-bromo-N,N-dimethylaniline, p-nitro-N,N-dimethylaniline; phosphines such as triethylphosphine, triphenylphosphine and diphenylphosphine; thioethers such as tetrahydrothiophene; esters such as ethylbenzoate; and nitriles such as actonitrile and benzonitrile.

Examples of $R^{10}$ include hydrogen, a methyl group, an ethyl group, a benzyl group and a trityl group. Examples of $R^{11}$ and $R^{12}$ include a cyclopentadienyl group, a methylcyclopentadienyl group, an ethylcyclopentadienyl group and a pentamethylcyclopentadienyl group. Examples of $R^{13}$ include a phenyl group, a p-tolyl group and a p-methoxyphenyl group. Examples of $R^{14}$ include tetraphenylporphin, phthalocyanine, allyl and methallyl. Examples of $M^2$ includes Li, Na, K, Ag, Cu, Br, I and $I_3$. Examples of $M^3$ include Mn, Fe, Co, Ni and Zn.

Examples of $M^1$ in $[Z^1]^-$, namely $[M^1G^1G^2\ldots G^f]$, include B, Al, Si, P, As, Sb, preferably B and Al. Examples of $G^1$, $G^2$ to $G^f$ include dialkylamino groups such as a dimethylamino group and a diethylamino group; an alkoxy groups or an aryloxy groups such as a methoxy group, an ethoxy group, a n-butoxy group and a phenoxy group; hydrocarbyl groups such as a methyl group, an ethyl group, a n-propyl group, an isopropyl group, a n-butyl group, an isobutyl group, a n-octyl group, a n-eicocyl group, a phenyl group, a p-tolyl group, a benzyl group, a 4-t-butylphenyl group and a 3,5-dimethylphenyl group; halogen atoms such as fluorine, chlorine, bromine and iodine; a heteroatom-containing hydrocarbyl groups such as a p-fluorophenyl group, a 3,5-difluorophenyl group, a pentachlorophenyl group, a 3,4,5-trifluorophenyl group, a pentafluorophenyl group, a 3,5-bis(trifluoromethyl) phenyl group, a bis(trimethylsilyl)-methyl group; organic metalloid groups such as a pentamethylantimony group, a trimethylsilyl group, a trimethylgermyl group, a diphenylarsine group, a dicyclohexylantimony group and a diphenylboron group.

Examples of $[Z^2]^-$, a non-coordinate anion, namely, a conjugate base of a Brønsted acid by itself (the acid has a logarithm of reciprocal of its acid dissociation constant (pKa) of not greater than −10) or a combination of the Brønsted acid and Lewis acid, include trifluoromethane sulfonic acid anion $(CF_3SO_3)^-$, bis(trifluoromethane-sulfonyl)methyl anion, bis (trifluoromethane sulfonyl) benzyl anion, bis(trifluoromethane sulfonyl) amide, perchlorate anion $(ClO_4)^-$, trifluoroacetic acid anion, $(CF_3CO_2)^-$, hexafluoroantimony anion $(SbF_6)^-$, fluorosulfonic acid anion $(FSO_3)^-$, chlorosulfonic acid anion $(ClSO_3)^-$, fluorosulfonic acid anion/antimony pentafluoride $(FSO_3/SbF_5)^-$, fluorosulfonic acid anion/ arsenic pentafluoride $(FSO_3/AsF_5)^-$, trifluoromethanesulfonic acid/antimony pentafluoride $(CF_3SO_3/SbF_5)^-$.

Examples of the ionic compound which forms an ionic complex by reacting with the above transition metal component (A), namely the compound of the component (B-1), include triethylammonium tetraphenylborate, tri-n-butylammonium tetraphenylborate, trimethylammonium tetraphenylborate, tetraethylammonium tetraphenyl borate, methyl (tri-n-butyl)ammonium tetraphenylborate, benzyl(tri-n-butyl)ammonium tetraphenyl borate, dimethyldiphenylammonium tetraphenylborate, triphenyl (methyl) ammonium tetraphenyl borate, trimethyl-anilinium tetraphenylborate, methylpyridinium tetraphenylborate, benzyl-pyridinium tetraphenylborate, methyl(2-cyanopyridinium) tetraphenylborate, triethylammonium tetrakis(pentafluorophenyl)borate, tri-n-butyl-ammonium tetrakis(pentafluorophenyl)borate, triphenylammonium tetrakis(pentafluorophenyl)borate, tetra-n-butylammonium tetrakis (pentafluorophenyl)borate, tetraethylammonium tetrakis(pentafluorophenyl)borate, benzyl(tri-n-butyl)ammonium tetrakis (pentafluorophenyl) borate, methyldiphenylammonium tetrakis(pentafluorophenyl)borate, triphenyl(methyl)ammonium tetrakis(pentafluorophenyl)borate, methylanilinium tetrakis(pentafluorophenyl)borate, dimethylanilinium tetrakis (pentafluorophenyl)borate, trimethylanilinium tetrakis (pentafluorophenyl)borate, methylpyridinium tetrakis (pentafluorophenyl)borate, benzylpyridinium tetrakis (pentafluorophenyl)borate, methyl(2-cyanopyridinium) tetrakis(pentafluorophenyl)borate, benzyl(2-cyanopyridinium) tetrakis(pentafluorophenyl)borate, methyl(4-cyanopyridinium) tetrakis(pentafluorophenyl)borate, triphenylphosphonium tetrakis(pentafluorophenyl)-borate, dimethylanilinium tetrakis[bis(3,5-ditrifluoromethyl)phenyl]borate, ferrocenium tetraphenylborate, silvertetraphenylborate, trityitetraphenylborate, tetraphenylporphyrinmanganate tetraphenylborate, ferrocenium tetrakis (pentafluorophenyl)borate, (1,1'-dimethylferrocenium) tetrakis(pentafluorophenyl)borate, decamethylferrocenium tetrakis(pentafluorophenyl)borate, silver tetrakis(pentafluorophenyl)borate, trityl tetrakis(pentafluorophenyl)borate, lithium tetrakis(pentafluorophenyl)borate, sodium tetrakis (pentafluorophenyl)borate, tetraphenylporphylin manganate tetrakis(pentafluorophenyl) borate, silver tetrafluoroborate, silver hexafluorophosphate, silver hexafluoroarsenate, silver perchlorate, silver trifluoroacetate and silver trifluoromethanesulfonate. The component (B-1) may be used singly or in combination of two or more thereof.

On the other hand, as the aluminoxane of component (B-2), there may be mentioned a linear aluminoxane represented by the general formula (V):

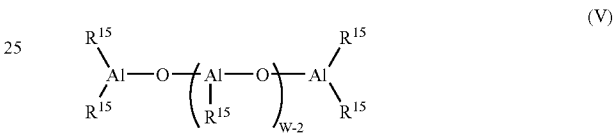

(V)

wherein $R^{15}$, which may be the same or different, represents a hydrocarbyl group such as an alkyl group having 1 to 20, preferably 1 to 12 carbon atoms, an alkenyl group, an aryl group, an arylalkyl group, or a halogen atom, w represents an average degree of polymerization, generally an integer of 2 to 50, preferably 2 to 40, or a cyclic aluminoxane represented by the general formula (VI)

(VI)

wherein $R^{15}$ and w are the same as in the above general formula (V).

As the method for producing the above aluminoxane, there may be mentioned a method in which an alkylaluminum is brought into contact with a condensation agent such as water. The production method is not particularly limited and any known method may be employed. Specific examples of the production method include (a) a method in which an organic aluminum compound is dissolved in organic solvent, and the solution is contacted with water, (b) a method in which an organic aluminum compound is previously added in polymerization stage, and water is thereafter added, (c) a method in which an organic aluminum compound is reacted with water of crystallization contained in a metal salt or the like, or water absorbed in an inorganic or organic compound, and (d) a method in which tetraalkyldialuminoxane is reacted with trialkylaluminum, followed by further reaction with water. The aluminoxane may be insoluble in toluene. The aluminoxane may be used singly or in combination with two or more thereof.

The catalytic component (A) and the catalytic component (B) may be used in such a proportion that, when the compound (B-1) is used as the catalytic component (B), the molar ratio of (A)/(B-1) is preferably 10:1 to 1:100, more preferably 2:1 to 1:10. When the ratio is outside the above range, the catalyst cost per unit weight of the polymer becomes high and not practical. When compound (B-2) is used, the molar ratio is preferably in the range of 1:1 to 1:1,000,000, more preferably 1:10 to 1:10,000. When the ratio is outside the above range, the catalyst cost per unit weight of the polymer becomes high, and not practical. (B-1) or (B-2) may be used, as catalyst component (B), singly or in combination with two or more thereof.

As the polymerization catalyst for use in the production method of the present invention, an organic aluminum compound may be used as component (C), in addition to the above mentioned component (A) and component (B).

As the organic aluminum compound as component (C), there may be used a compound represented by the general formula (VII):

$$R^{16}_{v}AlJ_{3-v} \tag{VII}$$

wherein, $R^{16}$ represents an alkyl group having 1 to 10 carbon atoms, J represents a hydrogen atom, an alkoxy group having 1 to 20 carbon atoms, an aryl group having 6 to 20 carbon atoms or a halogen atom, and v is an integer of 1 to 3.

Examples of the compound represented by the above general formula (VII) include trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride, and ethylaluminum sesquichloride. These organic aluminum compounds may be used singly or in combination of two or more thereof.

In the production method of the present invention, a preliminary contact may be conducted using the above component (A), component (B) and component (C). The preliminary contact may be conducted by contacting the component (A) with, for example, component (B). However, the method is not particularly limited to the above method, and any known process may be employed. The preliminary contact is effective for improving the catalytic activity and for reducing the catalyst cost by a reduction of the amount of component (B) as a promoter. Furthermore, by contacting the component (A) with component (B-2), an effect of an increase in the molecular weight is also obtainable in addition to above effects. The temperature for the preliminary contact is generally −20° C. to 200° C., preferably −10° C. to 150° C., more preferably 0° C. to 80° C. In the preliminary contact, a solvent such as an inert hydrocarbon, an aliphatic hydrocarbon and an aromatic hydrocarbon may be used. Particularly preferably used is an aliphatic hydrocarbon.

The above catalyst component (A) and catalyst component (C) are used in such a proportion that the molar ratio of (A) to (C) is preferably 1:1 to 1:10,000, more preferably 1:5 to 1:2,000, further more preferably 1:10 to 1:1,000. By using the catalyst component (C), the polymerization activity per unit transition metal may increase, but use thereof in an excessive amount is not preferable because a waste of the organic aluminum is caused and because a large amount thereof is left in the polymer.

In the present invention, at least one of the catalyst components may be supported on a suitable carrier. There is no limitation as to the kind of the carrier, and any inorganic oxide carrier, other inorganic carrier and any organic carrier may be used. The use of an inorganic oxide carrier or other inorganic carrier is preferable, however.

Examples of the inorganic oxide carrier include $SiO_2$, $Al_2O_3$, MgO, $ZrO_2$, $TiO_2$, $Fe_2O_3$, $B_2O_3$, CaO, ZnO, BaO, $ThO_2$ and their mixtures such as silica-alumina, zeolite, ferrite and glass fiber. Above all $SiO_2$, $Al_2O_3$ are particularly preferable. The above inorganic oxide carrier may contain a small amount of a carbonate salt, a nitrate salt, a sulfate salt or the like.

On the other hand, as the other carriers than the above, there may be mentioned a magnesium compound and its complex salt represented by the general formula $MgR^{17}_xX^1_y$, such as $MgCl_2$, $Mg(OC_2H_5)_2$, wherein $R^{17}$ represents an alkyl group having 1 to 20 carbon atoms, an alkoxy group having 1 to 20 carbon atoms or an aryl group having 6 to 20 carbon atoms, $X^1$ represents a halogen atom or an alkyl group having 1 to 20 carbon atoms, x is 0 to 2, y is 0 to 2 with the proviso that x+y=2. $R^{17}$ and $X^1$ may each be the same or different.

As the organic carrier, there may be mentioned polymers, such as a polystyrene, a styrene-divinylbenzene copolymer, a polyethylene, a polypropylene, a substituted polystyrene and a polyallylate, starch and carbon.

Examples of the carrier preferably used in the present invention include $MgCl_2$, $MgCl(OC_2H_5)$, $Mg(OC_2H_5)_2$, $SiO_2$ and $Al_2O_3$. The properties of the carrier depend on its kind and the method of preparation thereof. Generally, however, the carrier has an average particle diameter in the range of 1 to 300 μm, preferably 10 to 200 μm, more preferably 20 to 100 μm.

When the particle diameter is small, the amount of fine powder in the polymer increases. When the particle diameter is large, the amount of coarse particles in the polymer increases to cause a reduction of the bulk density thereof and clogging in a hopper. The carrier generally has a specific surface area of 1 to 1,000 m²/g, preferably 50 to 500 m²/g, and a pore volume of 0.1 to 5 cm³/g, preferably 0.3 to 3 cm³/g.

When either the specific surface area or the pore volume of the carrier is outside the above range, the catalyst activity may occasionally decrease. The specific surface area and pore volume may be determined, for example, according to BET method from the volume of nitrogen gas adsorbed (see Journal of the American Chemical Society, vol. 60, p. 309 (1983)).

Further, it is preferred that the above carrier be calcined at generally 150 to 1,000° C., preferably 200 to 800° C. When at least one of the catalyst components is supported on the above carrier, it is desirable to support at least one of the catalyst components (A) and (B), preferably both components (A) and (B).

The method of loading at least one of the component (A) and component (B) on the above carrier is not particularly limited. Examples of the method include (a) a method in which at least one of the component (A) and component (B) is mixed with the carrier, (b) a method in which at least one of the component (A) and component (B) is mixed in an inert solvent with the carrier which has been previously treated with an organic aluminum compound or a halogen-containing silicone compound, (c) a method in which the component (A) and/or component (B) are reacted with an organic aluminum compound or a halogen containing silicon compound, (d) a method in which, after supporting the component (A) or component (B) on the carrier, it is mixed with the component (B) or component (A), (e) a method in which a product of the catalytic reaction of the component (A) with the component (B) is mixed with the carrier, and (f) a method in which the catalytic reaction of the component (A) with the component (B) is carried out in the presence of the carrier.

In the above reactions (d), (e) and (f), an organic aluminum compound as the component (C) may be added. In the present invention, when the above components (A), (B), (C) are contacted with each other, an elastic wave may be irradiated for preparation of the catalyst. As the elastic wave, there may be mentioned ordinary sonic wave. A supersonic wave is particularly preferable to use. Specifically, the supersonic wave has a frequency of 1 to 1,000 kHz, preferably 10 to 500 kHz.

The catalyst thus obtained may be used for polymerization as it is, or as solids after the removal of the solvent. In the present invention, the supporting of at least one of the component (A) and component (B) may be conducted within the polymerization system to prepare the catalyst. For example, after mixing at least one of the component (A) and component (B) with the carrier, if necessary together with an organic aluminum compound as the component (C), an olefin such as ethylene is introduced at the atmospheric pressure to 2 MPa (gauge). Then, pre-polymerization is conducted at −20 to 200° C. for 1 minute to 2 hours to prepare catalyst particles.

In the present invention, the mass ratio of the component (B-1) to the carrier is preferably 1:5 to 1:10,000, more preferably 1:10 to 1:500; the mass ratio of the component (B-2) to the carrier is preferably 1:0.5 to 1:1,000, more preferably 1:1 to 1:50. When a mixture of two or more kinds of the components (B) is used, the mass ratio of each of the components (B) and the carrier is preferably within above range. The mass ratio of the component (A) and carrier is preferably 1:5 to 1:10,000, more preferably 1:10 to 1:500.

When the proportion of the component (B) [component (B-1) or component (B-2)] and the carrier, or the proportion of the component (A) and the carrier is outside the above range, there is a possibility that the activity may decrease. The average particle diameter of the catalyst of the present invention thus prepared is generally 2 to 200 μm, preferably 10 to 150 μm, particularly preferably 20 to 100 μm, and the specific surface area is generally 20 to 1,000 m$^2$/g, preferably 50 to 500 m$^2$/g. When the average particle diameter is less than 2 μm, the amount of fine powder in the polymer may occasionally increase. On the other hand, when the average particle diameter exceeds 200 μm, the amount of coarse particles in the polymer may occasionally increase. When the specific surface area is less than 20 m$^2$/g, the activity may occasionally decrease. When the specific surface area exceeds 1,000 m$^2$/g, the bulk density of the polymer may occasionally decrease. In the catalyst used in the present invention, the amount of the transition metal in 100 g of the carrier is generally 0.05 to 10 g, particularly preferably 0.1 to 2 g. When the amount of the transition metal is outside the above range, the activity may occasionally decrease.

By supporting the catalyst components on the carrier in such manner, a polymer with an industrially advantageous high bulk density and an excellent particle size distribution is obtainable. The propylene-based polymer used in the present invention is produced by homopolymerizing propylene or copolymerizing propylene with and ethylene and/or an α-olefin having 4 to 20 carbon atoms using above mentioned polymerization catalyst.

In this case, the polymerization method is not specifically limited and any method such as a slurry polymerization method, a gas phase polymerization method, a bulk polymerization method, a solution polymerization method and a suspension polymerization method may be used. Of these, the slurry polymerization method and the gas phase polymerization method are particularly preferable.

As for the polymerization conditions, the polymerization temperature is generally −100 to 250° C., preferably −50 to 200° C., more preferably 0 to 130° C. The amount of the catalyst relative to the raw material feed is preferably such that the molar ratio of the raw material monomer to the above component (A) is preferably 1 to $10^8$, particularly 100 to $10^5$.

Further, the polymerization time is generally 5 minutes to 10 hours, the reaction pressure is preferably atmospheric pressure to 20 MPa (gauge), more preferably atmospheric pressure to 10 MPa (gauge).

The molecular weight of the polymer may be controlled by selection of the kind, the amount and the temperature of each catalyst component, and by the polymerization in presence of hydrogen. When a polymerization solvent is used, there may be used, for example, an aromatic hydrocarbon such as benzene, toluene, xylene or ethylbenzene, an aliphatic cyclic hydrocarbon such as cyclopentane, cyclohexane or methylcyclohexane, an aliphatic hydrocarbon such as pentane, hexane, heptane or octane, or a halogenated hydrocarbon such as chloroform or dichloromethane. These solvents may be used singly or in combination of two or more thereof. A monomer such as an α-olefin may be also used as the solvent. Depending on the polymerization method, the polymerization may be carried out without using a solvent.

Prior to the polymerization, a preliminary polymerization can be conducted using the above-described polymerization catalyst. The preliminary polymerization can be conducted by, for example, contacting a small amount of an olefin with a solid catalyst component. However, there is no limitation as to the polymerization method, and any known process can be employed. The olefin for use in the preliminary polymerization is not particularly limited, and the olefins exemplified above, such as ethylene, α-olefins having 3 to 20 carbon atoms, and their mixtures may be used. It is, however, advantageous to use the same olefin as that used in the polymerization.

The preliminary polymerization is generally performed at a temperature of −20 to 200° C., preferably −10 to 130° C., more preferably 0 to 80° C. A solvent such as an inert hydrocarbon, an aliphatic hydrocarbon, an aromatic hydrocarbon and a monomer may be used in the preliminary polymerization. Above all, the use of an aliphatic hydrocarbon is particularly preferable. The preliminary polymerization can also be conducted without using a solvent.

It is desirable that the conditions of the preliminary polymerization be controlled so that the intrinsic viscosity [η] (as measured in decalin at 135° C.) of the product of preliminary polymerization is at least 0.2 dl/g, preferably at least 0.5 dl/g, and amount of the product of preliminary polymerization per 1 mmol of the transition metal of the catalyst is 1 to 10,000 g, particularly 10 to 1,000 g.

The propylene-based polymer to be chlorinated can be previously subjected to an acid modification in the manner described hereinafter. By previously conducting the acid modification, the desired properties such as adhesiveness, coatability, sealability and bonding efficiency may be improved.

The acid modification method generally adopted for polyolefins may be suitably used for modifying propylene-based polymers and may be performed using a free radical initiator and an organic acid.

As the organic acid, there may be used an unsaturated carboxylic acid or a derivative thereof. Examples of the unsaturated carboxylic acid include acrylic acid, methacrylic acid, maleic acid, fumaric acid, itaconic acid, crotonic acid, citraconic acid, sorbic acid, mesaconic acid and angelic acid. As the organic acid derivative, there may be mentioned an acid anhydride, an ester, an amide, an imide and a metal salt. Examples of the acid derivative include maleic anhydride, itaconic anhydride, citraconic anhydride, methyl acrylate, methyl methacrylate, ethyl acrylate, butyl acrylate, monoethyl maleate, acrylamide, monomaleamide, maleimide, N-butylmaleimide, sodium acrylate and sodium methacrylate.

Above all, maleic anhydride is preferable. The above derivatives may be used singly or in combination of two or more thereof.

Any free radical initiator may be used without restriction. A suitable free radical initiator may be selected from the customarily known free radical initiators such as various organic peroxides and azo compounds, e.g. azobisisobutyronitrile and azobisvaleronitrile. Above all, an organic peroxide is suitably used.

Examples of the organic peroxide include diacyl peroxides such as dibenzoyl peroxide, di-3,5,5-trimethylhexanoyl peroxide, dilauroyl peroxide, didecanoyl peroxide, and di(2,4-dichlorobenzoyl) peroxide; hydroperoxides such as t-butyl hydroperoxide, cumene hydroperoxide, diisopropylbenzene hydroperoxide, and 2,5-dimethylhexane 2,5-dihydroperoxide; dialkyl peroxides such as di-t-butyl peroxide, dicumyl peroxide, 2,5-dimethyl-2,5-di(t-butylperoxy)hexane, and 2,5-dimethyl-2,5-di(t-butylperoxy)hexyn-3-$\alpha$,$\alpha$'-bis(t-butylperoxy)diisopropylbenzene; peroxy ketals such as 1,1-bis-t-butylperoxy-3,3,5-trimethylcyclohexane, and 2,2-bis(t-butylperoxy)butane; alkyl peresters such as t-butyl peroxyoctoate, t-butyl peroxypivalate, t-butyl peroxyneodecanate, and t-butyl peroxybenzoate; and peroxy carbonates such as di-2-ethylhexyl peroxy dicarbonate, di-isopropyl peroxy dicarbonate, di-sec-butyl peroxy dicarbonate, and t-butyl peroxy isopropylcarbonate. Above all, dialkyl peroxides are preferable. These peroxides may be used singly or in combination of two or more thereof.

The amounts of the above-described organic acid and free radical initiator are not specifically limited and may be appropriately determined according to the desired properties of the propylene-based polymer used. In general, however, the organic acid is used in an amount of 0.1 to 50 parts by mass, preferably 0.1 to 30 parts by mass, and the free radical initiator is used in an amount of 0.01 to 10 parts by mass, preferably 0.01 to 5 parts by mass, per 100 parts by mass of the propylene-based polymer used.

The method for acid treating is not specifically limited. For example, a method may be adopted in which the propylene-based polymer, the organic acid and free radical initiator are reacted by fusing and kneading them at a temperature of about 100 to 300° C. for about 10 seconds to 10 minutes using a roll mill, a Banbury mixer or an extruder. Alternately, there may be adopted a method in which the propylene-based polymer, the organic acid and free radical initiator are reacted at a temperature of about −50 to 300° C. for about 5 minutes to 2 hours in a suitable organic solvent such as a hydrocarbon solvent, e.g. butane, pentane, hexane, heptane, cyclohexane or toluene, a halogenated hydrocarbon solvent, e.g. chlorobenzene, dichlorobenzene or trichlorobenzene, or a liquefied $\alpha$-olefin.

The description will be next made of the chlorination reaction of the propylene-based polymer.

The propylene-based polymer used in the present invention is compatible with a hydrocarbon solvent. They are mixed in arbitral proportions to form a homogeneous liquid upon being heated and fused. The chlorination reaction may be performed at any temperature as long as the mixture may maintain in the liquid stage. However, since, at a high temperature, the chlorination reaction is apt to be simultaneously accompanied by dechlorination reaction to cause coloration, it is desirable to perform the reaction at as low a temperature as possible.

More preferably, the temperature is in the range of 30 to 140° C., since within this range the coloration is slight and the chlorinated product obtained has an excellent appearance. Further, the chlorination proceeds at an adequate reaction rate and does not require a long time for chlorination. The reaction time is generally in the range of 10 minutes to 24 hours.

The utilizable hydrocarbon solvent is not specifically limited as long as it has a boiling point of at least 50° C. and is liquid at room temperature. Generally, hexane, heptane, octane, isooctane, cyclohexane, toluene or xylene is used. Since the propylene-based polymer used in the present invention has a substantially high solubility, it is desirable to use a non-aromatic solvent such as hexane, heptane, octane, isooctane or cyclohexane.

It is preferred that the concentration of the propylene-based polymer in the hydrocarbon solvent be 5 to 70% by mass. Within this range, the coloration of the product hardly occurs and the industrial production can be carried out in an advantageous manner. The viscosity of the mixture of the both ingredients is preferably 3 Pa·s or less at a temperature at which the chlorination is carried out. Within this range, local violent chlorination reaction is prevented from proceeding and the resin is prevented from being carbonized. A viscosity of 3 Pa·s or less may be obtainable by adjusting the mixing proportion of the propylene-based polymer and the hydrocarbon, or by controlling the temperature.

As a consequence of the chlorination, chlorine is introduced in an amount so that the chlorinated propylene-based polymer has a chlorine content of 0.1 to 70% by mass. In general, the propylene-based polymer becomes soluble in an organic solvent as a consequence of the introduction of chlorine because the crystal structure of the polymer is degraded. When the chlorine content is below 0.1% by mass, however, almost no change occurs in the properties of the chlorinated product and, therefore, it is nonsense to perform the chlorination on an industrial scale. When the chlorine content exceeds 70% by mass, on the other hand, the chlorination reaction efficiency is reduced, which is economically disadvantageous.

When the chlorination is carried out by blowing a chlorine gas, it is preferred to irradiate ultraviolet rays or use a radical generating agent as a catalyst such as an organic peroxide or an azo compound such that the reaction proceeds efficiently. The chlorination reaction proceeds without using them, however. The chlorine gas may be blown by itself to effect the chlorination. Alternately, the chlorine gas may be diluted with an inert gas such as nitrogen or a hydrogen chloride gas to perform the chlorination. In this case, there can be obtained a merit that a rise of the temperature of the reaction system due to the heat of reaction can be prevented.

As an apparatus for carrying out the chlorination reaction, there may be used a reaction tank having an inside surface lined with a glass and equipped with a stirrer, a chlorine blowing port, a device for treating a by product waste gas, and a heating jacket. An ultraviolet lamp may be attached inside the tank, if necessary. It is desired that the stirring can be vigorously performed for reasons of capability of proceeding the reaction uniformly. It is also preferred that the apparatus be constructed such that the chlorine gas can be blown from the bottom of the reaction tank for reasons of improved reaction efficiency.

After the completion of the reaction, the product may be recovered by removing the hydrocarbon solvent under vacuum or with heating. If necessary, the thus obtained product is delivered as a commercial product as such or after having been adjusted to have a suitable concentration.

The chlorinated propylene-based polymer is obtained as solids. Thus, the polymer may be pelletized in the conventional manner or may be dissolved in a non-aromatic solvent such as heptane, hexane or cyclohexane, before it is placed on the market.

Except the above method, the chlorination may be performed using a compound having a suitable chlorine source. As the chlorine source, there may be mentioned, for example, $SO_2Cl_2$, $SOCl_2$, $AlCl_3$, ethylaluminum chloride, diethylaluminum chloride, $TiCl_4$, $MgCl_2$ and ethylmagnesium chloride.

As the reaction solvent, there may be mentioned, for example, a hydrocarbon solvent, an aromatic solvent and a halogen-containing solvent. Examples of the solvent include hexane, heptane, octane, toluene, xylene, chloroform, carbon tetrachloride, 1,1,2-trichloroethylene, chlorobenzene and orthchlorobenzene. These solvents may be used as a mixture of two or more thereof. When two or more solvents are mixed, it is preferred that one of the solvents be a halogen-containing solvent.

The proportion of the chlorine source and the propylene-based polymer varies with the desired chlorination degree but, from the standpoint of the amount of the chlorine to be introduced into the polymer and purification of the product after the reaction, is generally such that 0.1 to 100% by mass of the chlorine is used based on the mass of the polymer.

The concentration of the polymer in the reaction is preferably 1 to 70% by mass for reasons of productivity and viscosity of the solution.

The reaction temperature is desirably between room temperature and 200° C. However, as long as the raw material polymer is homogeneously dissolved, the reaction temperature is not specifically limited to the above range. The reaction time is generally 10 minutes to 24 hours.

After the termination of the reaction, the reaction mixture obtained may be purified by precipitation by a suitable solvent such as water, methanol or ethanol. The purification may be performed after removing the solvent or concentration by distillation under vacuum or with heating.

The chlorinated propylene-based polymer thus obtained according to the present invention may be used as a coating component for the preparation of a coating composition. Alternately, it may be used as an ink component for the preparation of an ink composition. Further, it may be used as an adhesive component for the production of an adhesive or bonding composition.

According to the present invention, by chlorination of the specific propylene-based polymer, there can be provided a chlorinated propylene-based polymer having the following features:

(1) it has a high solubility in a non-aromatic solvent having a low environmental burden even when it has a low degree of chlorination, (2) it can be inhibited from suffering a decrease in the properties inherent to polypropylenes, such as durability, mechanical properties, appearance and hydrophobicity, by regulating its degree of chlorination at a low value.

The present invention will be next described in more detail by examples. However, the present invention is not limited to the examples.

PREPARATION EXAMPLE 1

Preparation of Low Crystalline Propylene Polymer (a) Preparation of Catalyst

Preparation of (1,2'-dimethylsilylene)(2,1'-dimethylsilylene)-bis(3-trimethylsilylmethylindenyl) zirconium dichloride In a Schlenk tube, 3.0 g (6.97 mmol) of a lithium salt of (1,2'-dimethylsilylene)(2,1'-dimethylsilylene)-bis(indene) were dissolved in 50 ml of THF and the solution was cooled to −78° C., to which 2.1 ml (14.2 mmol) of (iodomethyl)trimethylsilane was added dropwise. The mixture was stirred at room temperature for 12 hours and the solvent was removed by distillation. Then 50 ml of ether was added to the residue and the solution was washed with a saturated ammonium chloride solution. The organic phase was separated and dried. The solvent was removed by distillation to obtain 3.04 g (5.88 mmol) of (1,2'-dimethylsilylene)(2,1'-dimethylsilylene)-bis(3-trimethylsilylmethylindene) was obtained (yield 84%).

Next, under a nitrogen flow, the thus obtained 3.04 g (5.88 mmol) of (1,2'-dimethylsilylene)(2,1'-dimethy-lsilylene)-bis (3-trimethylsilylmethylindene) and 50 ml of diethyl ether were charged in a Schlenk tube and cooled to −78° C., to which a hexane solution of n-BuLi (1.54M, 7.6 ml (1.7 mmol)) was added dropwise. The mixture was returned to room temperature and stirred for 12 hours. Thereafter the diethyl ether was removed by distillation to leave solids. The solids were washed with 40 ml of hexane to obtain 3.06 g (5.07 mmol) of a lithium salt as an addition complex of diethyl ether (yield 73%).

The results of $^1$H-NMR (90 MHz, THF-$d_8$) measurement were as follows: δ 0.04 (s, 18H, trimethylsilyl); 0.48 (s, 12H, dimethylsilylene); 1.10 (t, 6H, methyl); 2.59 (s, 4H, methylene); 3.38 (q, 4H, methylene); 6.2 to 7.7 (m, 8H, Ar—H).

The thus obtained lithium salt was dissolved in 50 ml of toluene under a nitrogen flow. The solution was cooled to −78° C., to which a suspension, obtained by suspending 1.2 g (5.1 mmol) of zirconium tetrachloride in 20 ml of toluene and cooled in advance to −78° C., was added dropwise. Thereafter, the mixture was stirred at room temperature for 6 hours. The solvent of the reaction solution was removed by distillation. The residue thus obtained was recrystallized from dichloromethane to obtain 0.9 g (1.33 mmol) of (1,2'-dimethylsilylene)(2,1'-dimethylsilylene)-bis(3-trimethylsilylmethylindenyl) zirconium dichloride (yield 26%).

The results of $^1$H-NMR (90 MHz, $CDCl_3$) measurement were as follows: δ 0.0 (s, 18H, trimethylsilyl); 1.02, 1.12 (s, 12H, dimethylsilylene); 2.51 (dd, 4H, methylene); 7.1 to 7.6 (m, 8H, Ar—H).

(b) Polymerization

To a stainless steel reactor having an inside volume of 0.25 m³ were continuously fed n-heptane at a feed rate of 20 liter/h, triisobutylaluminum (manufactured by Japan Alkyl Aluminum Inc.) at a feed rate of 16 mol/h, methylaluminoxane (manufactured by Albemal Inc.) at a feed rate of 15 mmol/h, and (1,2'-dimethylsilylene)(2,1'-dimethylsilylene)-bis(3-trimethylsilylmethylindenyl) zirconium dichloride (obtained in (a) above) at a feed rate of 15 μmol/h. While maintaining the polymerization temperature at 60° C., hydrogen was continuously fed so that the hydrogen concentration in the gas phase was maintained at 54 mol % and the total pressure within the reactor was maintained at 0.75 MPa·G.

(c) Post Treatment

To the thus obtained polymer solution was added an additive shown below. Then, the solvent was removed at a temperature of the jacket of 200° C.

Additive: IRGANOX 1010 (manufactured by Ciba Speciality Chemicals, Inc.) 500 ppm The analytical values of the propylene homopolymer product are as follows. [mmmm]: 45 mol %, [mm]: 60 mol %, Tm-D: 74° C., [η]: 0.32 dL/g, and Mw/Mn: 1.9.

EXAMPLE 1

The propylene homopolymer (5 g) prepared in the above Preparation Example 1 was placed in a 100 ml flask whose inside was substituted with nitrogen, to which 40 ml of sulforan dehydrated by nitrogen bubbling. The mixture was then stirred at 80° C., to which 2 g of sulfonyl chloride were added. Then the mixture was stirred for 20 hours. The reaction mixture was poured in methanol and the precipitates were collected and dried to obtain 5 g of chlorinated polypropylene. The chlorinated polypropylene had a chlorine content of 0.6% by mass, [η] of 0.31 dL/g, [mm] of 59 mol %, Tm-D of 70° C. and a weight average molecular weight (Mw) of 62,000. To the thus obtained chlorinated polypropylene homopolymer (1 g) was added 10 ml of n-heptane. The mixture was then stirred at 30° C. The polymer was found to be completely dissolved to give a homogeneous solution.

COMPARATIVE EXAMPLE 1

The reaction of Example 1 was carried out under the same conditions except that the polyolefin raw material was changed to isotactic polypropylene (Mw: 180,000). The polymer was found not to be dissolved after the reaction. The chlorine content was 0% by mass. To the recovered polymer (1 g) was added 10 ml of n-heptane. The mixture was then stirred at 30° C. The polymer was found not to be dissolved. No homogeneous solution was obtained. The raw material isotactic polypropylene had [mm] of 98 mol % and Tm-D of 162° C.

EXAMPLE 2

The propylene homopolymer (10 g) prepared in the above Preparation Example 1 was placed in a 200 ml flask whose inside was substituted with nitrogen, to which 100 ml of 1,1,1-trichloroethane dehydrated by nitrogen bubbling. The solids were dissolved under reflux, to which 5 ml of sulfonyl. chloride and a solution of 0.1 g of azobisisobutyronitrile (AIBN) dissolved in 3 ml of trichloroethane were added dropwise in this order. Then the mixture was stirred for 2 hours. The reaction mixture was then poured in methanol and the precipitates were collected and dried to obtain 5 g of chlorinated polypropylene. The chlorinated polypropylene had a chlorine content of 5.9% by mass, [η] of 0.25 dL/g, [mm] of 60 mol % and a weight average molecular weight (Mw) of 42,000. To the thus obtained chlorinated polypropylene (1 g) was added 10 ml of n-heptane. The mixture was then stirred at 30° C. The polymer was found to be completely dissolved to give a homogeneous solution.

PREPARATION EXAMPLE 2

Preparation of Low Crystalline Butene Polymer:
In a 10 liter autoclave, 2,000 ml of n-heptane, 6,000 ml of 1-butene, 5.0 mmol of triisobutylaluminum and 20 µmol of dimethylanilinium borate were placed, into which 0.13 MPa of hydrogen was introduced. With stirring, the temperature was raised to 70° C., to which (1,2'-dimethylsilylene)(2, 1'dimethylsilylene)-bis(3-trimethylsilylmethylindenyl) zirconium dichloride was added in an amount of 40 µmol and the polymerization was performed for 2 hours. After completion of the polymerization reaction, the reaction mixture was dried under a reduced pressure to obtain 2,920 g of 1-butene homopolymer.
The analytical values of the 1-butene homopolymer product are as follows. [mmmm]: 70.1 mol %, [mm]: 89 mol %, Tm-D: 67° C., [η]: 0.44 dL/g, and Mw/Mn: 2.0.

EXAMPLE 3

A chlorinated butene polymer was prepared in the same manner as that in Example except that the butene polymer prepared in Preparation Example 2 was used in place of the propylene polymer. The chlorinated butene polymer had a chlorine content of 4.8% by mass, [η] of 0.43 dL/g, [mm] of 89 mol % and a weight average molecular weight (Mw) of 73,000. To the thus obtained chlorinated butene polymer (1g) was added 10 ml of n-heptane. The mixture was then stirred at 30° C. The polymer was found to be completely dissolved to give a homogeneous solution.

COMPARATIVE EXAMPLE 2

Commercially available chlorinated polypropylene (manufactured by Aldrich Inc., chlorine content: 26% by mass, Mw: 150,000) was found to be insoluble in n-heptane at 30° C.

INDUSTRIAL APPLICABILITY

According to the present invention there can be provided a chlorinated propylene-based polymer suitable for use in a coating, an ink, an adhesive, etc.

The invention claimed is:
1. A chlorinated propylene homopolymer having a chlorine content of 0.1 to 70% by mass, a weight average molecular weight (Mw) thereof as measured by gel permeation chromatography (GPC) of 5,000 to 100,000, and which is obtained by subjecting a propylene homopolymer to a chlorination treatment,
wherein said propylene homopolymer prior to chlorination satisfies the following requirements (1) to (3):
(1) the stereo-regularity index [mm] thereof determined from a peak derived from the methyl groups in the $^{13}$C-NMR spectrum is 20 to 90 mol %,
(2) the intrinsic viscosity [η] thereof as measured at 135° C. in a tetralin solvent is 0.01 to 0.5 dL/g, and
(3) the melting point (Tm-D) thereof as measured by differential scanning calorimeter (DSC) is 0 to 120° C.
2. A process for the production of a chlorinated propylene homopolymer according to claim 1, comprising:
chlorinating a propylene homopolymer using a chlorination agent, wherein said propylene homopolymer is obtained by homopolymerizing propylene in the presence of a polymerization catalyst comprising:
(A) a transition metal compound represented by the following formula (I)

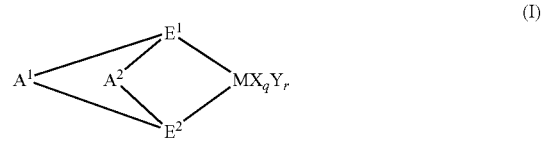

wherein
M represents a metal element belonging to the Groups 3 to 10 of the Periodic Table or to the lanthanoid series,
$E^1$ and $E^2$, which may be the same or different and form a crosslinked structure with $A^1$ and $A^2$, each represent a ligand selected from the group consisting of a substituted cyclopentadienyl group, an indenyl group, a substituted indenyl group, a heterocyclo-pentadienyl group, a substituted heterocyclopentadienyl group, an amide group, a phosphide group, a hydrocarbyl group and a silicon-containing group, X represents a σ bonding ligand, and when X is plural, X may be the same or different and may be crosslinked with other X, $E^1$, $E^2$ or Y, Y represents a Lewis base, and when Y is plural, Y may be the same or different and may be crosslinked with other Y, $E^1$, $E^2$ or X, $A^1$ and $A^2$, which may be the same or different, are each a bivalent crosslinking group bonding two ligands and each represent a hydrocarbyl group having 1 to 20 carbon atoms, a halogen-containing hydrocarbyl group having 1 to 20 carbon atoms, a silicon-containing group, a germanium-containing group, a tin-containing group, —O—, —CO—, —S—, —$SO_2$—, —Se—, —$NR^1$—, —$PR^1$—, —$P(O)R^1$—, —$BR^1$— or —$AlR^1$—, where $R^1$ represents a hydrogen atom, a halogen atom, a hydrocarbyl group having 1 to 20 carbon atoms or a halogen-containing hydrocarbyl group having 1 to 20 carbon atoms, q is an integer of 1 to 5 and represents [(valence of M)–2], and r is an integer of 0 to 3; and (B) a component selected from the group consisting of (B-1) a compound which can form an ionic complex by reaction with the above transition metal compound (A) and (B-2) an aluminoxane.

3. A method of making a coating comprising:
forming the coating with the chlorinated propylene homopolymer of claim 1.

4. A method of making an ink comprising:
forming the ink with the chlorinated propylene homopolymer of claim 1.

5. A method of forming an adhesive comprising:
forming the adhesive with the chlorinated propylene homopolymer of claim 1.

6. A chlorinated propylene homopolymer satisfying the following requirements:
(1) the chlorine content thereof is 0.1 to 70% by mass,
(2) the weight average molecular weight (Mw) thereof as measured by gel permeation chromatography (GPC) is 5,000 to 100,000, and
(3) the stereo-regularity [mm] thereof determined from a peak derived from the methyl groups in the $^{13}$C-NMR spectrum is 20 to 90 mol %.

7. A process for the production of a chlorinated propylene homopolymer according to claim 6, comprising:
chlorinating a propylene homopolymer using a chlorination agent, wherein said propylene homopolymer is obtained by homopolymerizing propylene in the presence of a polymerization catalyst comprising:
(A) a transition metal compound represented by the following formula (I)

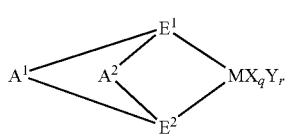

wherein
M represents a metal element belonging to the Groups 3 to 10 of the Periodic Table or to the lanthanoid series,
$E^1$ and $E^2$, which may be the same or different and form a crosslinked structure with $A^1$ and $A^2$, each represent a ligand selected from the group consisting of a substituted cyclopentadienyl group, an indenyl group, a substituted indenyl group, a heterocyclo-pentadienyl group, a substituted heterocyclopentadienyl group, an amide group, a phosphide group, a hydrocarbyl group and a silicon-containing group, X represents a σ bonding ligand, and when X is plural, X may be the same or different and may be crosslinked with other X, $E^1$, $E^2$ or Y, Y represents a Lewis base, and when Y is plural, Y may be the same or different and may be crosslinked with other Y, $E^1$, $E^2$ or X, $A^1$ and $A^2$, which may be the same or different, are each a bivalent crosslinking group bonding two ligands and each represent a hydrocarbyl group having 1 to 20 carbon atoms, a halogen-containing hydrocarbyl group having 1 to 20 carbon atoms, a silicon-containing group, a germanium-containing group, a tin-containing group, —O—, —CO—, —S—, —$SO_2$—, —Se—, —$NR^1$—, —$PR^1$—, —$P(O)R^1$—, —$BR^1$— or —$AlR^1$—, where $R^1$ represents a hydrogen atom, a halogen atom, a hydrocarbyl group having 1 to 20 carbon atoms or a halogen-containing hydrocarbyl group having 1 to 20 carbon atoms, q is an integer of 1 to 5 and represents [(valence of M)–2], and r is an integer of 0 to 3; and (B) a component selected from the group consisting of (B-1) a compound which can form an ionic complex by reaction with the above transition metal compound (A) and (B-2) an aluminoxane.

8. A method of making a coating comprising:
forming the coating with the chlorinated propylene homopolymer of claim 6.

9. A method of making an ink comprising:
forming the ink with the chlorinated propylene homopolymer of claim 6.

10. A method of forming an adhesive comprising:
forming the adhesive with the chlorinated propylene homopolymer of claim 6.

11. The chlorinated propylene homopolymer of claim 6 which has been made by:
chlorinating a propylene-based homopolymer obtained by homopolymerizing propylene in the presence of a polymerization catalyst comprising:
(A) a transition metal compound represented by the following formula (I)

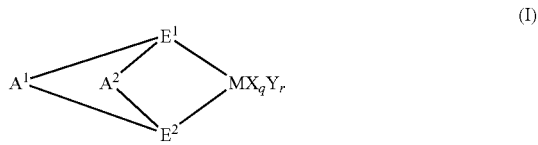

wherein
M represents a metal element belonging to the Groups 3 to 10 of the Periodic Table or to the lanthanoid series,
$E^1$ and $E^2$, which may be the same or different and form a crosslinked structure with $A^1$ and $A^2$, each represent a ligand selected from the group consisting of a substituted cyclopentadienyl group, an indenyl group, a substituted indenyl group, a heterocyclopentadienyl group, a substituted heterocyclopentadienyl group, an amide group, a phosphide group, a hydrocarbyl group and a silicon-containing group, X represents a σ bonding ligand, and when X is plural, X may be the same or different and may be crosslinked with other X, E$^1$, E$^2$ or Y, Y represents a Lewis base, and when Y is plural, Y may be the same or different and may be crosslinked with other Y, E$^1$, E$^2$ or X, A$^1$ and A$^2$, which may be the same or different, are each a bivalent crosslinking group bonding two ligands and each represent a hydrocarbyl group having 1 to 20 carbon atoms, a halogen-containing hydrocarbyl group having 1 to 20 carbon atoms, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$— or —AlR$^1$—, where R$^1$ represents a hydrogen atom, a halogen atom, a hydrocarbyl group having 1 to 20 carbon atoms or a halogen-containing hydrocarbyl group having 1 to 20 carbon atoms, q is an integer of 1 to 5 and represents [(valence of M)–2], and r is an integer of 0 to 3; and (B) a component selected from the group consisting of (B-1) a compound which can form an ionic complex by reaction with the above transition metal compound (A) and (B-2) an aluminoxane.

12. The chlorinated propylene homopolymer according to claim 6 satisfying the following requirements:
 (1) the chlorine content thereof is 0.1 to 70 % by mass,
 (2) the weight average molecular weight (Mw) thereof as measured by gel permeation chromatography (GPC) is 5,000 to 100,000, and
 (3) is soluble in n-heptane solvent at 30° C. in an amount of at least 10% by mass as the polymer concentration.

13. A process for the production of a chlorinated propylene homopolymer according to claim 12, comprising:
 chlorinating a propylene-based polymer using a chlorination agent, wherein said propylene homopolymer is obtained by homopolymerizing propylene in the presence of a polymerization catalyst comprising:
 (A) a transition metal compound represented by the following formula (I)

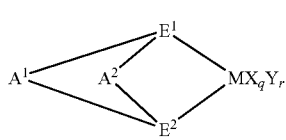

(I)

wherein

M represents a metal element belonging to the Groups 3 to 10 of the Periodic Table or to the lanthanoid series, E$^1$ and E$^2$, which may be the same or different and form a crosslinked structure with A$^1$ and A$^2$, each represent a ligand selected from the group consisting of a substituted cyclopentadienyl group, an indenyl group, a substituted indenyl group, a heterocyclo-pentadienyl group, a substituted heterocyclopentadienyl group, an amide group, a phosphide group, a hydrocarbyl group and a silicon-containing group, X represents a σ bonding ligand, and when X is plural, X may be the same or different and may be crosslinked with other X, E$^1$, E$^2$ or Y, Y represents a Lewis base, and when Y is plural, Y may be the same or different and may be crosslinked with other Y, E$^1$, E$^2$ or X, A$^1$ and A$^2$, which may be the same or different, are each a bivalent crosslinking group bonding two ligands and each represent a hydrocarbyl group having 1 to 20 carbon atoms, a halogen-containing hydrocarbyl group having 1 to 20 carbon atoms, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$— or —AlR$^1$—, where R$^1$ represents a hydrogen atom, a halogen atom, a hydrocarbyl group having 1 to 20 carbon atoms or a halogen-containing hydrocarbyl group having 1 to 20 carbon atoms, q is an integer of 1 to 5 and represents [(valence of M)–2], and r is an integer of 0 to 3; and (B) a component selected from the group consisting of (B-1) a compound which can form an ionic complex by reaction with the above transition metal compound (A) and (B-2) an aluminoxane.

14. A method of making a coating comprising:
 forming the coating with the chlorinated propylene homopolymer of claim 12.

15. A method of making an ink comprising:
 forming the ink with the chlorinated propylene homopolymer of claim 12.

16. A method of forming an adhesive comprising:
 forming the adhesive with the chlorinated propylene homopolymer of claim 12.

17. A chlorinated propylene homopolymer having a chlorine content of 0.1 to 70% by mass and having a weight average molecular weight (Mw) thereof as measured by gel permeation chromatography (GPC) is 5,000 to 100,000 satisfying the following requirements (1) to (3):
 (1) the stereo-regularity index [mm] thereof determined from a peak derived from the methyl groups in the $^{13}$C-NMR spectrum is 20 to 90 mol %,
 (2) the intrinsic viscosity [η] thereof as measured at 135° C. in a tetralin solvent is 0.01 to 0.5 dL/g, and
 (3) the melting point (Tm-D) thereof as measured by differential scanning calorimeter (DSC) is 0 to 120° C.

18. The chlorinated propylene homopolymer of claim 17, which has been made by:
 subjecting a propylene homopolymer to a chlorination treatment.

19. The chlorinated propylene homopolymer of claim 17, which has been made by:
 chlorinating a propylene homopolymer obtained by homopolymerizing propylene in the presence of a polymerization catalyst comprising:
 (A) a transition metal compound represented by the following formula (I)

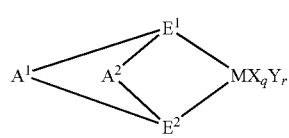

(I)

wherein

M represents a metal element belonging to the Groups 3 to 10 of the Periodic Table or to the lanthanoid series, E$^1$ and E$^2$, which may be the same or different and form a crosslinked structure with A$^1$ and A$^2$, each represent a ligand selected from the group consisting of a substituted cyclopentadienyl group, an indenyl group, a substituted indenyl group, a heterocyclopentadienyl group, a substituted heterocyclopentadienyl group, an amide group, a phosphide group, a hydrocarbyl group and a silicon-containing group, X represents a σ bonding ligand, and when X is plural, X may be the same or different and may be crosslinked with other X, $E^1$, $E^2$ or Y, Y represents a Lewis base, and when Y is plural, Y may be the same or different and may be crosslinked with other Y, $E^1$, $E^2$ or X, $A^1$ and $A^2$, which may be the same or different, are each a bivalent crosslinking group bonding two ligands and each represent a hydrocarbyl group having 1 to 20 carbon atoms, a halogen-containing hydrocarbyl group having 1 to 20 carbon atoms, a silicon-containing group, a germanium-containing group, a tin-containing group, —O—, —CO—, —S—, —$SO_2$—, —Se—, —$NR^1$—, —$PR^1$—, —$P(O)R^1$—, —$BR^1$— or —$AlR^1$—, where $R^1$ represents a hydrogen atom, a halogen atom, a hydrocarbyl group having 1 to 20 carbon atoms or a halogen-containing hydrocarbyl group having 1 to 20 carbon atoms, q is an integer of 1 to 5 and represents [(valence of M)–2], and r is an integer of 0 to 3; and (B) a component selected from the group consisting of (B-1) a compound which can form an ionic complex by reaction with the above transition metal compound (A) and (B-2) an aluminoxane.

\* \* \* \* \*